Nov. 30, 1965  L. R. WHITTINGTON  3,220,729
TETHERBALL OR LIKE INFLATABLE ARTICLE
Filed Aug. 15, 1962  2 Sheets-Sheet 2
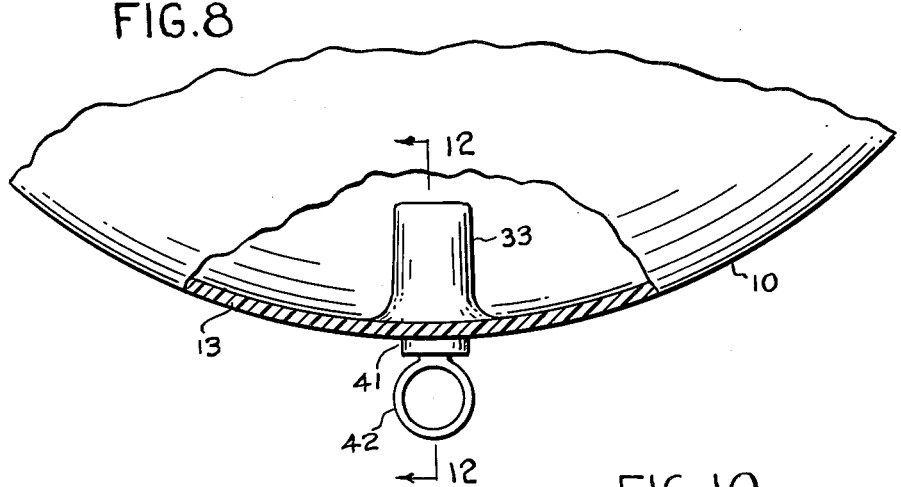
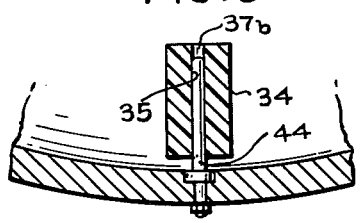
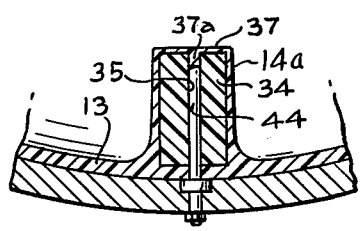
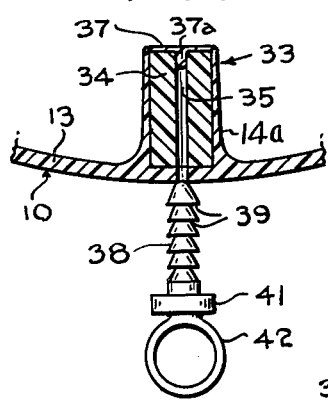
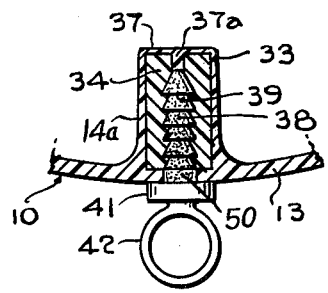
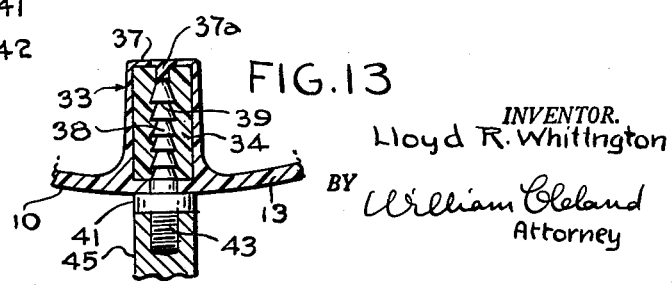
INVENTOR.
Lloyd R. Whittington
BY *William Cleland*
Attorney

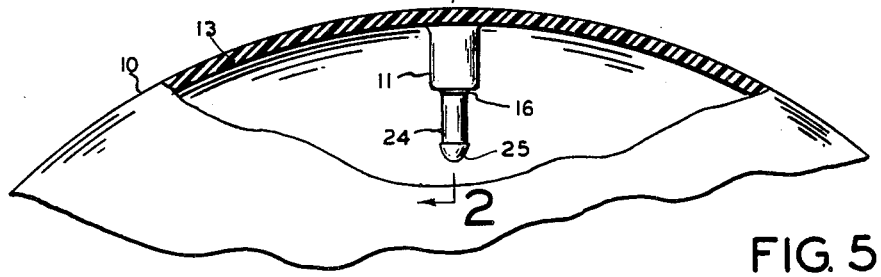
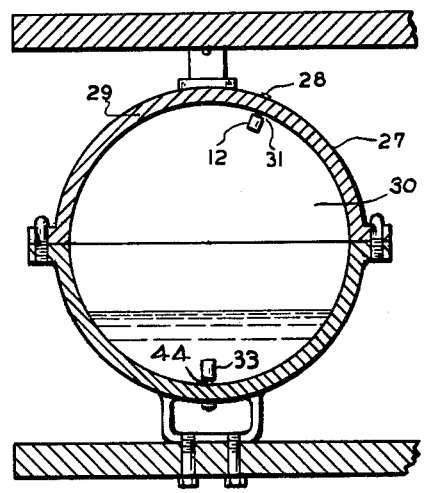
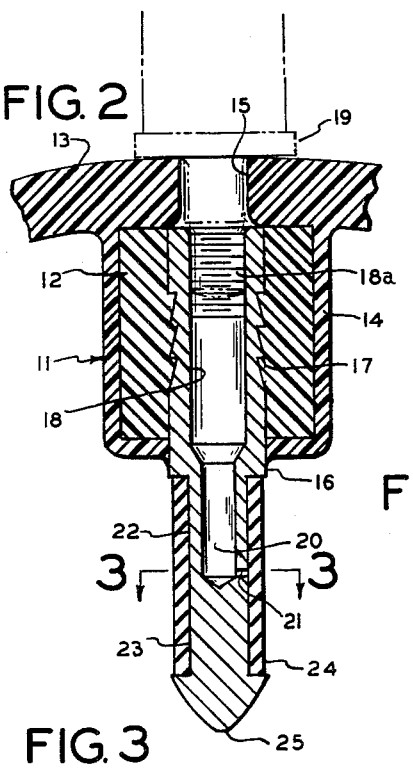
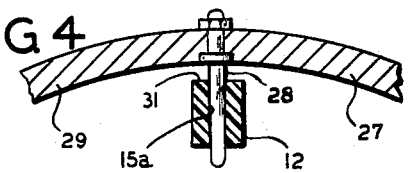
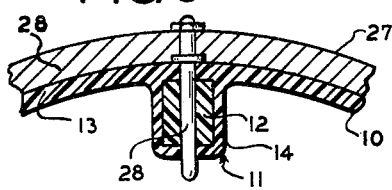
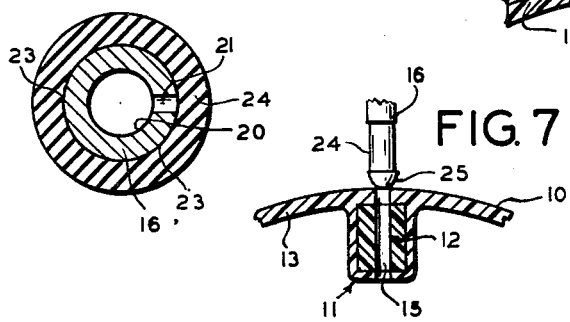

3,220,729
TETHERBALL OR LIKE INFLATABLE ARTICLE
Lloyd R. Whittington, Ashland, Ohio, assignor to The National Latex Products Company, Ashland, Ohio, a corporation of Ohio
Filed Aug. 15, 1962, Ser. No. 217,183
4 Claims. (Cl. 273—58)

This invention relates to inflatable articles, and in particular relates to tetherballs.

Heretofore, in the manufacture of inflated vinyl balls, it has been a difficult problem to include the production of tetherballs, because the usual molding procedure involved inflating the balls after molding, which was not conductive to integrally molding therein a tether ring or like connector.

One object of the present invention is to provide a rotationally cast, hollow inflatable article with a tether or like connector strongly anchored thereto, to withstand severe use or abuse of the article without separation therefrom.

Another object of the invention is to provide an improved, economical method of rotationally casting inflatable balls or like articles with a leak-proof tether or like connector strongly anchored thereto.

These and other objects of the invention will be manifest from the following brief description and the accompany drawings.

Of the accompanying drawings:

FIGURE 1 is a fragmentary view of a spherical athletic ball, partly broken away and in section to show incorporated therein one embodiment of an improved inflation valve.

FIGURE 2 is a greatly enlarged vertical cross-section through the ball and inflation valve, taken substantially on the line 2—2 of FIGURE 1.

FIGURE 3 is a further enlarged cross-section, taken substantially on the line 3—3 of FIGURE 2.

FIGURE 4 is a greatly enlarged fragmentary cross-section through the wall of an article-forming mold, illustrating an initial step in the process of producing an athletic ball to have the improved inflation valve therein.

FIGURE 5 is a fragmentary cross-section, on a reduced scale, of an article-forming cavity mold, illustrating the mold in closed condition for an article-forming step.

FIGURE 6 is a greatly enlarged fragmentary cross-section, corresponding to FIGURE 4, but illustrating the article fully formed in the mold, with valve mounting means in the same.

FIGURE 7 is a view corresponding to FIGURE 6, but illustrating the formed article removed from the mold and also showing beginning of a step for inserting the improved valve through the valve mounting means, toward the position shown in FIGURE 2.

FIGURE 8 is a view corresponding to FIGURE 1, illustrating another embodiment of the invention, by which the inflatable article of FIGURE 1 is made adaptable for use as a tetherball.

FIGURE 9 is a view corresponding to FIGURE 4, but illustrating an initial step in the process for providing a housing in the ball for retaining a tetherball connector.

FIGURE 10 is a view corresponding to FIGURE 6, illustrating the ball fully formed in the mold, and including the housing for the tether connecter.

FIGURE 11 is a view corresponding to FIGURE 7, but enlarged with respect thereto, illustrating the ball removed from the mold and the beginning of a step of inserting the tetherball connector into the housing therefor.

FIGURE 12 is a view corresponding to FIGURE 2, taken substantially on the line 12—12 of FIGURE 8, and illustrating the air-sealed, anchoring connection of the connector with respect to the housing for the same.

FIGURE 13 is a view like FIGURE 12, showing another form of anchoring connector for affixing the ball on a rigid rod to form toy bar bells.

Referring to FIGURES 1, 2 and 3 of the drawings, there is illustrated a hollow inflatable athletic ball 10, having integrally incorporated in the relatively thin wall 13 thereof a valve housing 11, which protrudes inwardly of said wall. The housing 11 may include a solid cylindrical body or insert 12 of rubber-like elastic material, such as pre-fused polyvinyl chloride, and extensions 14 of material of the wall 13 which are integrally bonded to the insert. A solid body 12 of fused polyvinyl chloride, of the proportions best shown in FIGURES 4, 6 and 7, is inherently resilient but substantially inflexible or semi-rigid.

Extending through the wall 13 of the article and the insert 12 may be a cylindrical passage 15, within which an outer end of a metal stem or member 16 is forcibly received against the resiliency of the block 12, to be firmly affixed in the passage 15 in air-sealing relationship. Annular serrated portions 17 are provided on the outer periphery of the stem 16 to anchor the stem within the insert 12.

Extending axially inwardly through the stem 16 may be a passage 18 for inward reception of a suitable inflation tool, which may include a part adapted to be screwed into a threaded upper end portion 18a in said passage, as shown in chain-dotted lines at 19 in FIGURE 2. The passage 18 has a reduced inward extension 20 at the terminal end of which is a small aperture 21, extending to the longitudinal center of annular groove 22 defining an elongated cylindrical surface 23. A cylindrical tube or sleeve 24, of air-impervious rubber or like elastic material, may be yieldingly expanded onto said surface 23, substantially to the full length of groove 22, and is thereby adapted normally to seal said opening 21 against escape of inflation air from the article outwardly through the stem passage 18. For inflating the ball 10, however, inflation air is forced from the inflation tool 19 into the passage 18, through aperture 21, and into the space between the tube and sealing surface 23, whereby the tube is yieldingly expanded to allow passage of inflation air around both ends of the same. Tube 24 preferably is of substantial length, as shown, in relation to the size of the aperture 21, to provide a maximum area of sealing surface on the cylindrical stem portion 23. The tube preferably is made slightly shorter than the space between the shoulders to obviate any tendency for the tube to buckle and thereby minimize the sealing contact with surface 23.

The inner end of the stem 16 may be tapered to the blunt point, as indicated at 25, to facilitate insertion of the valve stem assembly through the passage 15 during production of the article, as will be described later.

In use of the improved valve device, inflation air from a suitable source (not shown) is supplied to the interior of ball 10, through tool 19, an inner end of which is threaded into a threaded inner end 18a of the stem, or by insertion of a suitable elongated inflation needle into the stem passage 18. In either instance inflation air is forced through the aperture 21 in the stem to expand the elastic tube 24, and thereby to permit the inflation air to pass the ends of the sleeve to the interior of the article. When the article is fully inflated and the inflation tool 19 is withdrawn, internal pressure within the article will hold the rubber sleeve in tightly contracted, pressure-air sealing relation against the cylindrical surface 23, to prevent return of inflation air outwardly through the passage 18 in the stem.

The outer diameter of the elastic tube 24 preferably is such that the thickness of the wall thereof will be somewhat less than the depth of the groove 22, so that the stem 16 may be inserted through the passage 15, in a manner previously described, with the tube attached to the stem and without dislodging the tube.

One method of the invention will be best described by reference to FIGURES 4 to 7 of the drawings. In practicing such method, there is provided a sectional cavity mold 27, having a pin 28 secured to the wall 29 thereof to project radially inwardly from the article-forming mold cavity surface 30 (see FIGURES 4 and 5). While the mold is open, an operator positions a cylindrical insert 12 of pre-fused vinyl plastic or like material in the mold, by reception of the pin 28 through passage 15a in the insert. The outer end 31 of the insert may be in spaced relation to said cavity surface 30, as shown in FIGURE 4.

After placing a predetermined quantity of heat-fusible, vinyl plastisol, such as polyvinyl chloride, in the bottom part of the mold, the operator closes the mold and causes the same to be rotated about a plurality of axes, in known manner, thereby to form the plastisol into a ball 10 of uniform wall thickness on the article-forming surface 30 of the mold. This rotational step is carried out in the presence of controlled heat which progressively raises the temperature of the contained material to a point at which, after subsequent cooling, the material now forming the article has attained maximum strength and other physical properties.

The formed article (see FIGURE 6) will have a passage 15 formed through the wall 13 of the same and through the insert 12, and the operator by means of a suitable tool, now forcibly inserts the rigid valve stem 16 inwardly through said passage 15 pointed inner end 25 first (see FIGURE 7), until the serrated end of the stem is firmly affixed or anchored in the position best shown in FIGURE 2, by contraction of the housing material to full air-sealing relation about the stem. This step in the method is best performed while the housing insert 12 is still hot and relatively soft and pliable, as it would be immediately after removal of the formed article from the mold 27. Under this condition, the soft, pliable inner surface portions of the insert 12, defined by passage 15 thereof, will be molded by compression to the shape of the outer end portion of stem 16. During this step, also, the elastic sleeve 24 is retained in the groove 22 of the stem 16. Upon cooling the article the plug 12 will reharden in solid condition in which it will retain a permanently molded shape about said outer end of the stem, including the serrated portions 17 thereof, and will contract and strongly embrace the stem in full air-sealing relationship.

Articles 10 also may be produced by use of other forming methods, such as by slush molding or injection molding, to have the housing 11 integrally incorporated in the article wall 13. Accordingly, it is contemplated that the housing may be either integral with the article wall 13, or may be otherwise formed with an insert 12 as described. In any event the housing 11 is in complete air-sealing relationship about the valve stem.

Thus has been provided a substantially fool-proof inflation valve of the character described, and a simple and effective method for integrally incorporating the same in a ball or like article. The valve structure described above also has a distinct advantage in that, once the article has been inflated to desired permanent size and spherical shape, it may be deflated by removing the valve stem assembly 16, as by threaded attachment of the tool 19 at the stem part 18a, and forcibly withdrawing the stem assembly from the housing passage 15. To this end, the serrations 17 on the stem 16 are shaped and arranged to facilitate such withdrawal of the stem, but to obviate accidental inward removal of the stem from the housing 11. Accordingly, this feature of the invention herein makes it possible to deflate the ball by removing the stem 16 from housing 12, whereby the finished ball may be shipped or stored in compact, flattened condition. When the flattened ball is required for use, it is only necessary to reinsert the stem 16, as shown in FIGURES 1 and 2, and to inflate the ball as before with use of said inflation tool 19.

Referring to the embodiment of the invention particularly as shown in FIGURES 8 and 12, the ball 10 may in production be converted into a tetherball, by provision of an inwardly protruding housing 33 integral with wall 13. Housing 33 may include a solid cylindrical body or insert 34 of rubber-like elastic material, such as pre-fused polyvinyl chloride, which is particularly suitable if inherently resilient but substantially inflexibly solid. In actual practice, the material of insert 34 is of such hardness as to resist depression by a thumbnail pressed against the same with substantial force, as compared with the relatively soft flexible elastic material of the wall of the article. The wall material extends as a coating 14a integrally embracing the insert, including the inner end of the same, and projects into the insert passage 35 in the form of an inflation-air sealing plug or cap 37.

Extending inwardly within the passage 35 to the outwardly extending portion 37a of cap 37, there may be a serrated metal connector or closure member 38 (see FIGURE 12) about which material of the insert has been molded and contracted in a manner previously described and/or to be described, and thereby being strongly anchored in air-sealing relationship to the housing insert 34. Anchoring resistance to outward removal of the serrated connector 38 from the vinyl insert 34 is enhanced by a tapered or undercut formation of the serrations defining a plurality of outwardly presented annular shoulders 39, 39. An outward extension of the connector 38 may include a collar 41 engaging the outer surface of the ball and a perforated end or ring or anchor 42 affixed to the same, as for attachment of a tether rope or other ball-supporting means (not shown). An advantage of this construction is that the connector is adapted to be rotatable within the housing 33, and thereby to eliminate the need for separate swivel joint parts on the connector. Lubrication of the serrated portion of the connector with a non-drying lubricant, such as glycerine, illustrated by the stippling 50 in FIGURE 12, facilitates such rotation but is not necessarily essential.

In use of ball 10 for the game of tetherball it may be, for example, suspended by a rope or cord (not shown) from an upright pole, the object being for the opposing players to wrap the rope around the pole the greatest number of convolutions by striking the ball in opposite directions with the hands or with rackets.

The tether anchoring housing 33 and connector 38 thereon may be best located in the ball at a point substantially opposite to the value housing 11. This facilitates mold opening and ball stripping operations in the production of such tetherballs. No amount of twisting of the connector 38 within the housing 33 during such use can cause loss of inflation air, due to the effectiveness of the air-sealing cap 37.

The connector 38 may be incorporated in the ball by the rotational casting method described above in connection with FIGURES 1 and 7, and in fact the valve housing 11 and connector housing 33 may be formed simultaneously. For this purpose and prior to the aforementioned rotational step the cylindrical polyvinyl insert 34 is applied to the mold cavity surface 30 (see FIGURES 5 and 9) by reception of a projecting pin 44 thereon within passage 35 in the insert. The last step is accomplished as described above in connection with mounting the valve housing insert 12, except that the inner end of pin 44 is allowed to extend to a point short of the inner end of vinyl insert 34 to leave a small void 37b exposed at the inner end of the passage 35 (see FIGURE 9). The inner end of the insert 34 is positioned in spaced relation to the mold surface as before. During the above described rotational casting step, the vinyl plastisol which forms the article wall 11 will also deposit an appreciable thickness of vinyl about insert 34, including the inner end thereof, and fills the aforesaid void 37b inwardly of the pin 44 and thereby forms a reinforced air-sealing cap 37.

Immediately after removal from the mold, the ball is inflated, and while the vinyl insert 34 is still hot and relatively pliable the rigid tether connector or member 38 is forcibly inserted inwardly within the passage 35, pointed end first (see FIGURE 11), until the serrations thereof are completely embedded in the heat-moldable material of the insert, thereby strongly to affix or anchor the connector therein, as shown in FIGURE 12, upon cooling and contraction of the molded vinyl material about the serrations. In this condition the collar 41 on the connector engages the outer surface of the ball and the ring-shaped extension 42 extends freely outwardly thereof. The tightly molded condition of the insert 34 about the connector serrations is sufficient to seal the passage 35 independently of the integral vinyl cap 37 which seals the inner end of the insert passage. In any event the serrated connector may be lubricated at the time it is mounted in the insert 34 as previously described, and thereby to make the connector more readily rotatable within the insert.

To assure a very strongly anchoring connection between the connector 38 and housing the major diameter of at least the serrated portion of the connector should be much greater than the original diameter of the insert passage 35. As for example, the major diameter of the serrations may be on the order of three times the diameter of the passage (see FIGURE 11). Under such conditions it has been found advantageous to insert the connector in the passage as described above, while the connector is at a temperature within a range between 150° F. and 250° F., for example, to accomplish full molding and contraction of the thermo-plastic insert about the serrations. Prior to said insertion of the connector, the latter may be dipped in glycerine to accomplish the aforementioned lubricated rotational connection between the connector and the housing.

FIGURE 13 shows a modification of the invention which is in all respects like the device shown in FIGURE 12, except that the serrated adapter 38 has a threaded outer end extension 43 adapted for threaded connection with an end of a rod 45. This rod may be similarly threaded at its opposite end to mount another inflated ball thereon, as for providing a bar bell like device which will float in water. Like parts in FIGURE 13 are otherwise designated by the same numerals as in FIGURE 12.

With particular reference to the structures shown in FIGURES 8 to 13, the inserts 34 are adapted to be cut to length from tubular stock. An insert 34, however, may be otherwise provided to have the passage 35 extending therethrough to less than the full length of the same. In other words, in the finished articles of FIGURES 12 and 13, the inner end of insert passage 35 would be sealed or closed independently of the cap 37 formed during the rotational casting step of the method.

Modifications of the inventon may be resorted to without departing from the spirit thereof or the scope of the appended claims.

What is claimed is:

1. A hollow inflated article of flexible, elastic plastic material and of the type adapted to be suspended on an elongated flexible element; a body of relatively hard, inflexible synthetic resin having a heat bonding affinity for said elastic plastic material, and being integrally bonded to the wall of the article to project inwardly thereof; said body having a passage therethrough and being encased in a sheath of elastic plastic material which is an anchored extension of said wall, said sheath being integrally attached to the encased inner portions of the body and sealing the inner end of said passage against outward passage of inflation medium from the inflated article; an elongated rigid member inwardly received in said sealed body passage and having a series of longitudinally spaced shoulder portions anchoringly embraced by inner portions of said body; said member having a rigid extension thereof outwardly of the wall of the article and provided with anchor means for attachment of a said flexible suspension element; said anchoringly embracing portions of said body having the structural characteristics resulting from said rigid member having been inserted in said sealed body passage while the body was in a heat-softened condition and the body having been subsequently cooled and contracted about said series of spaced shoulder portions of the rigid member, firmly to restrain the same against forcible separation of the member from the elastic body in use of the article suspended on a said flexible element.

2. An article as set forth in claim 1, said anchor means including an integral apertured enlargement of the rigid member.

3. An article as set forth in claim 1, said body being of polyvinyl chloride and said inner end of said passage being closed by a portion of said sheath extended into the inner end of the passage and bonded to said polyvinyl chloride body.

4. An article as set forth in claim 1, including the provision of a fluid lubricating substance between said rigid member and said body to facilitate relative rotation between the same.

References Cited by the Examiner
UNITED STATES PATENTS

| | | | |
|---|---|---|---|
| 2,226,246 | 12/1940 | Kloepping | 273—58 |
| 2,477,899 | 8/1949 | Rempel | 264—86 |
| 2,629,134 | 2/1953 | Molitor | 264—310 |
| 2,935,320 | 5/1960 | Chupa | 273—58 |
| 2,941,804 | 6/1960 | Chupa | 273—58 |
| 3,100,641 | 8/1963 | Nicholls et al. | 273—65 |

DELBERT B. LOWE, *Primary Examiner.*